United States Patent [19]
Baba

[11] Patent Number: 5,808,984
[45] Date of Patent: Sep. 15, 1998

[54] OPTICAL INFORMATION RECORDING AND/OR REPRODUCING APPARATUS AND METHOD ARRANGED TO DETECT INCLINATION OF OBJECTIVE LENS

[75] Inventor: Hisatoshi Baba, Yokohama, Japan

[73] Assignee: Canon Kabushiki Kaisha, Tokyo, Japan

[21] Appl. No.: 721,044

[22] Filed: Sep. 26, 1996

[30] Foreign Application Priority Data

Sep. 27, 1995 [JP] Japan ..................................... 7-249125

[51] Int. Cl.⁶ ......................................................... G11B 7/00
[52] U.S. Cl. .......................................... 369/44.32; 369/54
[58] Field of Search ................................. 369/50, 53, 54, 369/58, 59, 47, 48, 32, 44.28, 44.32, 44.14

[56] References Cited

U.S. PATENT DOCUMENTS

| | | |
|---|---|---|
| 4,858,214 | 8/1989 | Baba . |
| 4,955,011 | 9/1990 | Baba . |
| 5,056,075 | 10/1991 | Maruta et al. ........................ 369/58 X |
| 5,559,770 | 9/1996 | Hiroki et al. . |

FOREIGN PATENT DOCUMENTS 5-298724  11/1993  Japan .

Primary Examiner—Muhammad N. Edun
Attorney, Agent, or Firm—Fitzpatrick, Cella, Harper & Scinto

[57] ABSTRACT

An optical information recording and/or reproducing apparatus for carrying out at least one of recording and reproduction of information by projecting a light beam condensed by an objective lens onto an information track of a recording medium, includes a detecting device for detecting an inclination of an optical axis of the objective lens with respect to a direction perpendicular to a surface of the recording medium and a control device for inhibiting recording or reproduction of information, based on a detection result of the detecting device.

10 Claims, 6 Drawing Sheets

OPTICAL INFORMATION RECORDING AND/OR REPRODUCING APPARATUS AND METHOD ARRANGED TO DETECT INCLINATION OF OBJECTIVE LENS

BACKGROUND OF THE INVENTION

1. Field of the Invention

The present invention relates to an optical information recording and/or reproducing apparatus and method for optically recording information in an information recording medium such as an optical disk or reproducing the information therefrom.

2. Related Background Art

The conventional optical information recording and/or reproducing apparatus is arranged to perform two servo controls in recording or reproducing information by irradiating a recording medium such as an optical disk with a light spot. Namely, the apparatus performs tracking control to move the objective lens for condensing light in the tracking direction so that a light spot tracks an information track and performs focus control to move the objective lens in the focus direction so as to make the light spot focus on the surface of medium. The apparatus usually has a mechanism for moving an optical head and a carriage unit in the radial direction of the recording medium over a wide range, and this mechanism permits the light spot to access a desired track in the recording medium. Such a mechanism normally has a two-stage actuator structure comprised of an actuator for moving the objective lens and an actuator for moving the optical head including the objective lens.

Incidentally, in order to realize quicker access, it is necessary to reduce the weight of the optical head and the carriage unit and to increase the moving velocity. In the case of the two-stage actuator structure as described above, the apparatus needs a control circuit for controlling each of the two actuators, so that the structure of the control circuit becomes complicated. The applicant publicly showed an objective lens driving apparatus well reduced in the weight and enabling quick access in Japanese Laid-open Patent Application No. 5-298724. This objective lens driving apparatus realized not only the quick access, but also simplification of the control circuit and cost reduction of the apparatus.

The above objective lens driving apparatus can perform such quick access on one hand, but on the other hand, because of the structure of the actuator, a movable unit is elastically supported so as to assure a long stroke, which makes the actuator easy to incline, especially, easy to pitch in the seek direction. Because of it, especially upon operation with a strong driving force or over a long moving distance, such as the seek operation, the actuator was easy to incline, so as to cause the objective lens to incline, which resulted in the problem that the quality of the light spot on the medium surface was degraded to adversely affect recording or reproduction of data.

SUMMARY OF THE INVENTION

In order to solve the problem in the conventional apparatus, an object of the present invention is to provide an optical information recording and/or reproducing apparatus and method capable of performing recording or reproduction with high reliability by inhibiting a recording or reproducing operation when the inclination of the objective lens is greater than a predetermined value.

The above object can be achieved by an optical information recording and/or reproducing apparatus for carrying out at least one of recording and reproduction of information by projecting a light beam condensed by an objective lens onto an information track of a recording medium, comprising:

detecting means for detecting an inclination of an optical axis of the objective lens with respect to a direction perpendicular to a surface of the recording medium; and control means for inhibiting the recording or reproduction of information, based on a detection result of the detecting means.

The above object can also be achieved by an optical information recording and/or reproducing method for carrying out at least one of recording and reproduction of information by projecting a light beam condensed by an objective lens to an information track of a recording medium, comprising:

a step of detecting an inclination of an optical axis of the objective lens with respect to a direction perpendicular to a surface of the recording medium; and a step of inhibiting said recording or reproduction of information, based on a detection result in the detecting step.

The invention will be described in detail with the embodiments to follow.

DETAILED DESCRIPTION OF THE PREFERRED EMBODIMENTS

Figure 1:
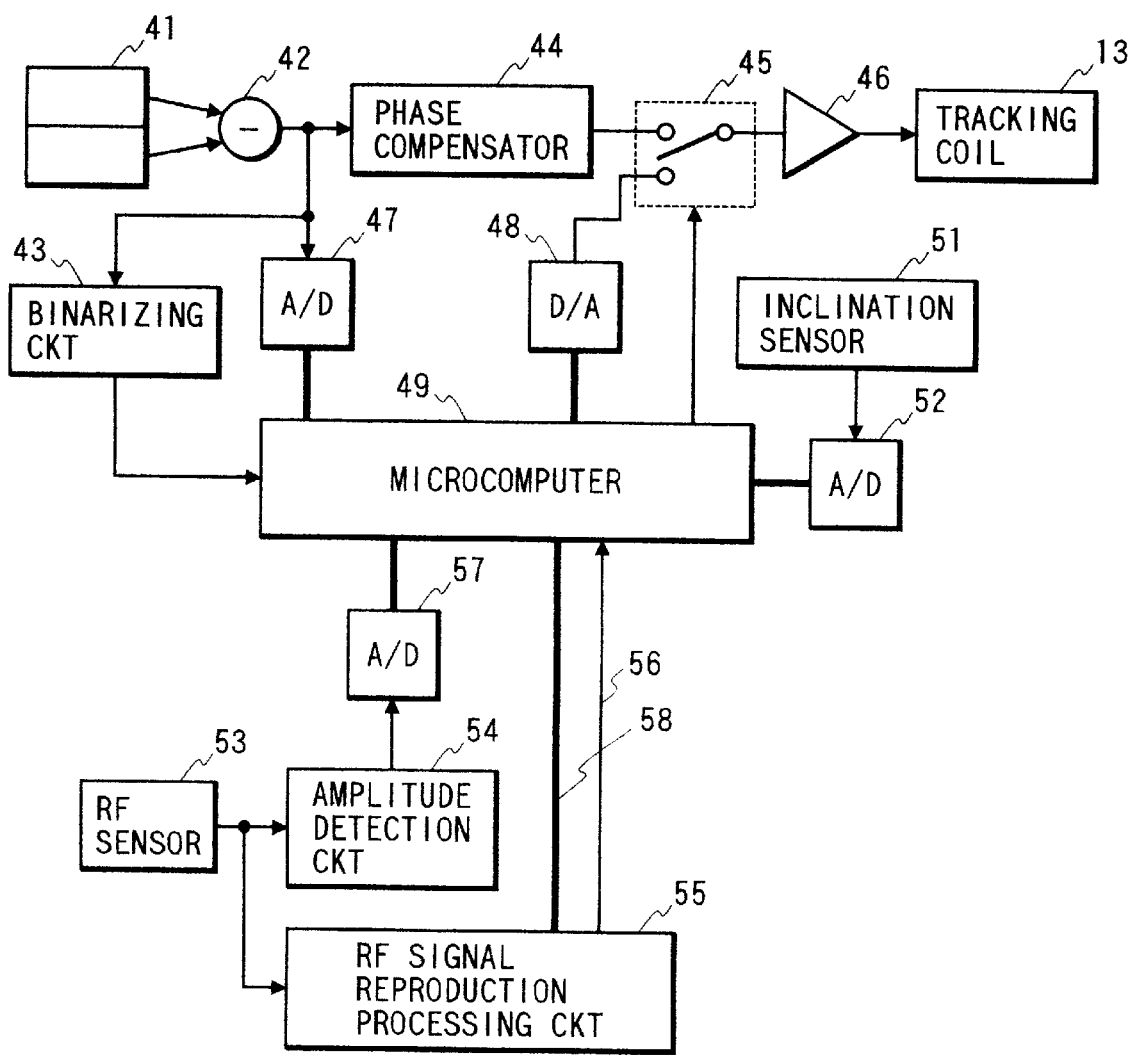
FIG. 1 is a block diagram to show an embodiment of the optical information recording and/or reproducing apparatus of the present invention.

The embodiments of the present invention will be described in detail with reference to the drawings. FIG. 1 is a block diagram to show an embodiment of the optical information recording and/or reproducing apparatus of the present invention. In FIG. 1, reference numeral 41 designates a tracking sensor comprised of a bisected photosensor, which detects reflected light from an optical disk (not shown) being an information recording medium. Reception signals of two sensor elements in the tracking sensor 41 are differentially detected by a differential amplifier 42 to produce a tracking error signal indicating a direction and an amount of deviation of the light spot relative to the center of track. The tracking error signal obtained by the differential amplifier 42 is supplied via a phase compensator 44 for stabilizing a tracking servo loop and via a switch 45 to a driver 46. Then the driver 46 power-amplifies the signal to drive a tracking coil 13, thereby moving the actuator in the tracking direction as described below and thus displacing the objective lens therewith to effect such tracking control as to prevent the light spot from departing from the track. The switch 45 is switched by a control line from a microcomputer 49, so as to change over from the tracking operation to the seek operation, and vice versa. The present embodiment adopts the single-stage actuator structure, and is arranged to use this actuator to move the objective lens in the radial direction of disk so as to permit the light spot to access any track across the entire area of disk. The structure of the actuator will be described hereinafter in detail.

The tracking error signal is binarized by a binarizing circuit 43 and the signal thus binarized is supplied to the microcomputer 49. The microcomputer 49 is a processor circuit comprising a main control unit of the optical information recording and/or reproducing apparatus of the present embodiment, which controls the associated sections of the apparatus to control the operation to record information in the disk or to reproduce the information therefrom. This control also includes the control of the seek operation to move the light spot to a desired track. Upon the seek operation, a counter (not shown) inside the microcomputer 49 counts the binary signal from the binarizing circuit 43 to detect the number of tracks which the light spot has crossed (the moving distance of the light spot). Upon the seek operation, the microcomputer 49 detects the moving velocity of the light spot from a track crossing frequency of the binary signal from the binarizing circuit 43. The microcomputer 49 calculates a control amount of the actuator, based on the moving distance and the moving velocity of the light spot, and supplies a control signal obtained via a D/A converter 48 and the switch 45 to the driver 46, thereby controlling the seek operation so as to move the actuator in accordance with a velocity profile preliminarily set.

The reflected light from the disk is also received by an RF sensor 53. This reception signal includes information recorded on the disk, and an RF signal reproduction processing circuit 55 processes an output signal (referred to hereinafter as an RF signal) from the RF sensor 53 to reproduce address information and normal recording information. The RF signal reproduction processing circuit 55 outputs a header section timing signal 56 indicating a timing of the position of the head of the address information recorded, to the microcomputer 49. This timing signal is used as a timing of amplitude detection when an amplitude detection circuit 54 detects the amplitude of the RF signal and detects an inclination of the actuator, based thereon, as detailed later. An amplitude value obtained by the amplitude detection circuit 54 is taken via an A/D converter 57 into the microcomputer 49.

Also, the RF signal reproduction processing circuit 55 calculates an error rate of the address information from an error correcting signal attached to the address information of disk. The address information 58 and the error rate obtained in the RF signal reproduction processing circuit 55 are transferred through a bus to the microcomputer 49. The error rate of the address information is used for detection of the inclination of the actuator as discussed later. An inclination sensor 51 is a detection sensor for detecting an inclination of the actuator, i.e., an inclination of the objective lens with respect to the optical axis. The inclination sensor 51, as detailed below, is attached to the actuator holding the objective lens, and is arranged to optically detect the inclination of the actuator. An output signal from the inclination sensor 51 is taken via an A/D converter 52 into the microcomputer 49.

Figure 2:
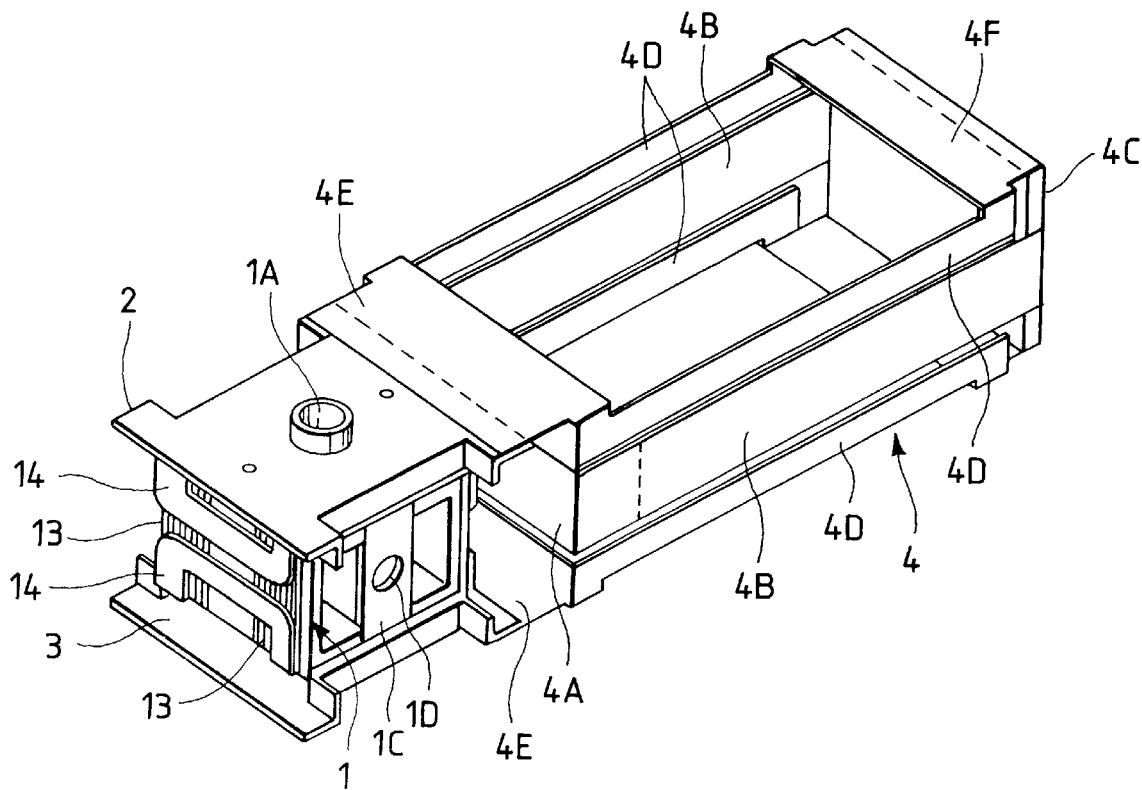
FIG. 2 is a perspective view to show the appearance of an actuator used in the embodiment of FIG. 1.

Next explained is the structure of the actuator used in the present embodiment. FIG. 2 is a perspective view to show the appearance of the actuator. In FIG. 2, the actuator 1 is disposed in the vicinity of the bottom part of the disk being a recording medium, and the objective lens 1A is held at the tip thereof. A fixed optical system having a semiconductor laser as a light source is disposed at a predetermined position inside the apparatus, and a light beam emerging from the fixed optical system is guided through a hole 1D into the actuator 1. A flap mirror is provided under the objective lens 1A in the actuator 1, and the light beam, having passed through the hole 1D, is reflected upward by the flap mirror and is then condensed by the objective lens 1A to be projected as a fine light spot onto an information track of the disk. The top and bottom of the actuator 1 are supported by respective rectangular support members 2, 3.

Figure 3:
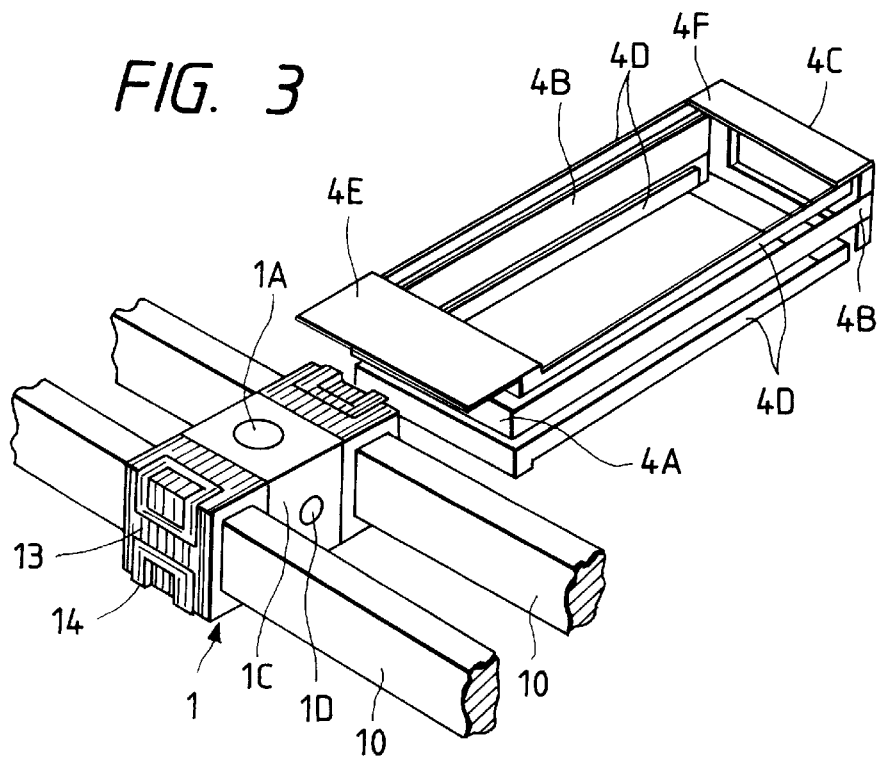
FIG. 3 is a perspective view to show a state of the actuator from which rectangular support members 2 and 3 are taken away.
Figure 4:
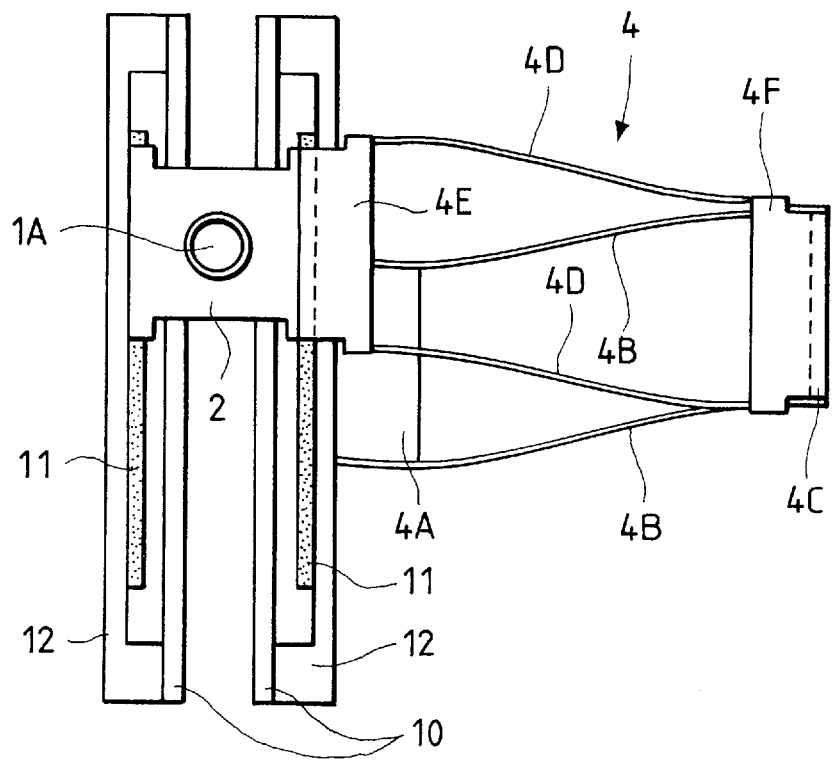
FIG. 4 is a plan view to show a state of the actuator of FIG. 2 moving in the tracking direction.

FIG. 3 is a perspective view to show a state of the actuator from which the rectangular support members 2, 3 are taken away. Two through holes penetrating the sides of the actuator 1 are provided in the tip portion of the actuator 1 and before and after the objective lens 1A, and inner yokes 10 are set each through the two through holes. The two inner yokes 10 extend parallel to the tracking direction (or the seek direction) and a tracking coil 13 is arranged to surround the two inner yokes 10. A focus coil 14 is provided in the side of the tracking coil 13. Each inner yoke 10 is provided with an outer yoke 12 in parallel as shown in FIG. 4, and the outer yoke 12 and inner yoke 10 are connected to each other at the both ends. A magnet 11 is secured to the inner wall surface of each outer yoke 12 so as to face the inner yoke 10. This structure forms a necessary magnetic circuit so as to make magnetic flux act perpendicular to the tracking coil 13.

The actuator 1 has a composite parallel plate spring mechanism 4, and this mechanism permits the actuator 1 to linearly move in the radial direction of the disk. Describing it specifically, the composite parallel plate spring mechanism 4 is first comprised of a fixed base member 4A fixed to the back face of the outer yoke 12, a pair of first left and right parallel plate springs 4B fixed at their one end to both ends of the fixed base member 4A and extending in a direction perpendicular to the tracking direction, a movable frame member 4C to which the pair of parallel plate springs 4B are fixed at the other end, and two upper and lower pairs of second parallel plate springs 4D fixed to the top and bottom and both ends of the movable frame member 4C and connected each to the rectangular support members 2, 3 at the tip thereof. The both ends of the two upper and lower pairs of second parallel plate springs 4D are integrally formed with hinge portions 4E and 4F provided above and below as shown in FIG. 2, and the hinge portions 4E, 4F are constructed in such a structure as to permit an upward and downward hinge operation by slight elastic deflection within the range of clearance between the first parallel plate springs 4B and the second parallel plate springs 4D.

Here, when a drive current is supplied to the tracking coil 13, the necessary driving force is generated by the action of the magnetic circuit as described above, so as to move the actuator 1 along the inner yokes 10. Upon this movement of actuator 1, the first and second parallel plate springs 4B, 4D of the composite parallel plate spring mechanism 4 work to allow movement in the tracking direction while being deflected as supporting the actuator 1. Namely, when the actuator 1 moves in the tracking direction, the first and second parallel plate springs 4B, 4D of the composite parallel plate spring mechanism 4 are deflected as shown in FIG. 4. Since the base end of each first parallel plate spring 4B is fixed to the fixed base member 4A, the end of the movable frame member 4C draws an arcuate locus of motion. On the other hand, the end of the second plate springs 4D connected to the rectangular support members 2, 3 draws an arcuate locus of motion opposite to the foregoing one on the movable frame member 4C side. Therefore, the two arcuate loci of motion cancel each other, and the combined motion thereof is corrected so as to draw a linear locus of motion.

In this way, the actuator 1 can move in a right linear locus in the radial direction of disk, which keeps the optical axis of the light beam from deviating from the center of the objective lens 1A, whereby the light beam can stably be projected onto the disk without decreasing the light intensity of the light beam. When a drive current is supplied to the focus coil 14, the driving force in the focus direction occurs to move the objective lens 1A in the focus direction as deflecting the hinge portions 4E and 4F, thus performing the focus control. The present embodiment employs just one actuator 1 as described above to perform the seek operation of the light beam across the entire region of disk and the tracking control on a desired track of disk.

Figure 5:
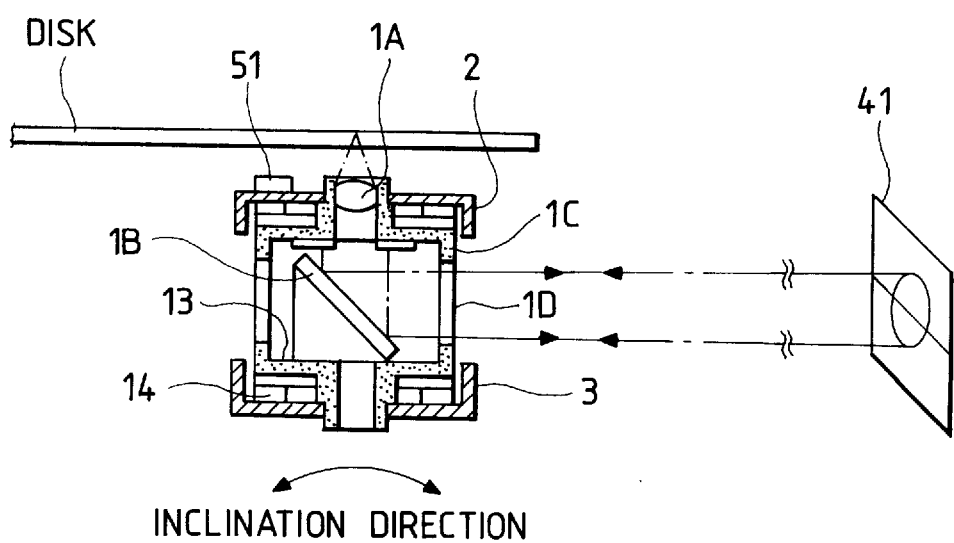
FIG. 5 is a sectional view to show the internal structure of the actuator of FIG. 2.

FIG. 5 is a sectional view to show a state in which the light beam is projected from the actuator 1 to the disk. The flap mirror 1B as described above is provided inside the actuator 1. The light beam emerging from the fixed optical system (not shown) is incident through the hole 1D into the actuator 1 and this incident light is reflected by the flap mirror 1B and is condensed by the objective lens 1A to converge on the disk. Numeral 41 denotes the tracking sensor of FIG. 1, and the bisected tracking sensor 41 detects the reflected light from the disk via the objective lens 1A and flap mirror 1B. Then the tracking error signal is obtained by differentially detecting the detection signals from the two sensor elements in the tracking sensor 41 by the differential amplifier 42.

The inclination sensor 51 described with FIG. 1 is provided near the objective lens 1A of the tracking actuator 1. The inclination sensor 51 is a sensor for detecting an inclination of the actuator 1, i.e., an inclination of the objective lens 1A (in other words, an inclination of the optical axis of the objective lens 1A with respect to the direction perpendicular to the disk surface), which is comprised of a reflection type photo interrupter having a light emitting element for emitting light to the disk and a light receiving element for receiving reflected light from the disk. Here, when the distance changes between the inclination sensor 51 and the disk, the quantity of light incident to the light receiving element of the inclination sensor 51 changes. Thus, the distance between the inclination sensor 51 and the disk can be measured from a reception signal of the light receiving element and the inclination of the actuator 1 can be detected based on the result. Namely, the objective lens 1A on the actuator 1 is kept at a constant distance from the disk by the action of focus servo, and with occurrence of an inclination of the actuator 1 in this state, the distance between the inclination sensor 51 and the disk changes. Therefore, an output signal from the light receiving element of the inclination sensor 51 changes. Since this signal changes in proportion to the distance between the inclination sensor 51 and the disk, the degree of the inclination of the actuator 1 can be detected from the output signal from the light receiving element.

There are many detection methods other than the foregoing for detecting the inclination of the actuator 1, as detailed hereinafter, but, in the case of a dedicated detection element like the inclination sensor 51 being used, the inclination can be detected with high accuracy, because the inclination of the actuator is detected directly. An example of the other detection methods is a method for detecting the inclination, based on amplitude values of address signal of disk as detailed hereinafter, but the detection method with the inclination sensor 51 can detect the inclination, regardless of address areas and data areas of disk, and can also detect the inclination for disks without address areas and for disks of a format with a low probability of occurrence of the address area.

Figure 6:
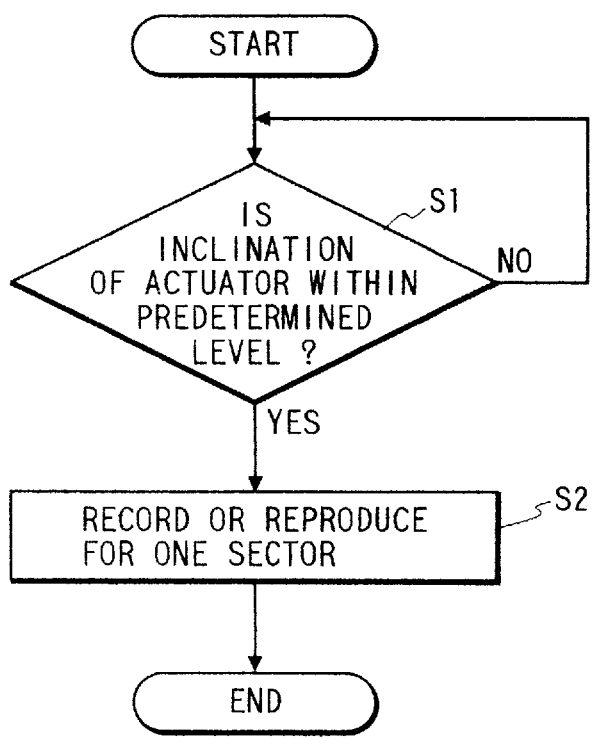
FIG. 6 is a flowchart for explaining the operation of the embodiment of FIG. 1.

Next explained is the specific operation of the above embodiment. FIG. 6 is a flowchart to show the operation upon recording or reproducing information in the present embodiment. In the present embodiment the microcomputer 49 always checks the inclination of the actuator 1 before recording of information (S1). The inclination sensor 51 detects the inclination of actuator 1 and the detection result is taken through the A/D converter 52 into the microcomputer 49. A permissible reference value is preliminarily determined for the inclination of actuator 1. The microcomputer 49 compares the detection value detected by the inclination sensor 51 with the reference value. If the inclination is greater than the reference value, the computer continues checking the inclination of actuator 1. On the other hand, if the inclination is smaller than the reference value, the computer permits recording or reproduction. Only in this case the microcomputer 49 controls the associated sections to perform recording or reproduction for one sector (S2).

The checking of the inclination of actuator 1 is carried out for every sector as being a minimum recording unit of disk. After completion of recording or reproduction for one sector, the computer again checks the inclination of actuator 1 at the next sector and executes a control to carry out or not to carry out recording or reproduction for the next sector, depending upon the result of checking. When data is recorded or reproduced at a sector, the microcomputer 49 compares address information (a sector address) reproduced by the RF signal reproduction processing circuit 55 with an objective sector address to confirm if the current sector is the objective sector. This confirmation of sector address may be carried out during checking the inclination of actuator 1 or after completion of checking the inclination of actuator 1.

Since the present embodiment is arranged in such a manner that the microcomputer detects the inclination of actuator 1 and performs such control as to inhibit recording or reproduction with the inclination being greater than the reference value, based on the judgment that the actuator (objective lens) 1 is inclined, and such control as to permit recording or reproduction with the inclination being smaller than the reference value, the present embodiment can secure the quality of data recorded in the disk or the quality of reproduction signal reproduced from the disk as avoiding the recording or reproducing operation when the quality of the light spot on the disk surface is degraded because of the inclination of actuator 1.

The above embodiment was arranged to detect the inclination of actuator 1 by the inclination sensor 51, but there are various detection methods other than it. The detection methods of the inclination of actuator 1 will be explained in the following. First explained is an example for detecting the inclination, based on amplitude values of address information. A round of each track in the disk being a recording medium is divided into plural sectors, and a sector address for identifying a sector is recorded at the head of each sector. A data area for data to be recorded therein is provided after the sector address. Here, a reproduction signal of sector address has such a property as to change its amplitude, depending upon the imaging performance of light spot. Namely, a sector address signal is recorded as a mark of about 1 $\mu$m along a track of disk, and this is reproduced by scanning the mark of sector address with the light spot condensed similarly in the size of about 1 μm and extracting a signal component (a change of reflectance or a change of direction of polarization) of the mark contained in the reflected light thereof. In this case, if the actuator 1 is inclined, so as to cause aberration in the light spot, the size of the light spot will increase on the disk surface, thus making smaller the signal component of the mark contained in the reflected light thereof. Accordingly, in this detection method the amplitude of reproduction signal of sector address signal decreases with inclination of the actuator 1, so that the inclination of actuator 1 is detected utilizing this principle.

When this detection method is used, the microcomputer 49 recognizes the timing of sector address of disk by the header section timing signal 56 from the RF signal reproduction processing circuit 55. Then at this timing the amplitude value of the reproduction signal of the amplitude detecting circuit 54 is taken through the A/D converter 57 into the microcomputer 49. The amplitude detecting circuit 54 has a function to detect an envelope of the RF signal, and by taking in an output signal from the RF signal reproduction processing circuit 55 at the timing of the header section timing signal 56 as described above, the amplitude of reproduction signal can be obtained of the sector address signal recorded at the head of sector. Detecting the amplitude of reproduction signal, the microcomputer 49 compares the amplitude value thus obtained with a predetermined level. If the amplitude value is smaller than the predetermined level, the microcomputer will determine that the actuator 1 is inclined, so as to inhibit recording or reproduction. On the other hand, if the amplitude value is greater than the predetermined level, the microcomputer will determine that the actuator 1 is not inclined, to perform recording or reproduction for one sector.

A criterion for judging the inclination of actuator 1 is set, for example, as approximately 60% of the reproduction signal amplitude of an ordinary sector address signal. As another example, the reproduction signal amplitude of sector address signal is actually measured, for example, upon shipment from the factory and the predetermined level of the criterion for the inclination of actuator 1 may be determined at approximately 60% of the measured value. Further, preferably, the reproduction signal amplitude of the sector address signal is measured upon the start of the apparatus or upon insertion of a disk and the predetermined level is set at about 80% of the amplitude value. Namely, such setting can exclude the influence of a variation of a reproduction signal amplitude, even though the reproduction signal amplitude of sector address signal varies due to variations of the disk characteristics and device characteristics. Therefore, the inclination of actuator 1 can be detected accurately.

Another method is as follows. Reproduction signal amplitudes of sector addresses, for example, for ten sectors are detected at timings of the header section timing signal 56 and are stored in a memory. Then calculated are a difference (a change value) between the minimum and the maximum of the amplitude values of these ten sectors and an average of the amplitude values of the ten sectors. If this change value is greater than 20% of the average, the actuator 1 will be determined to be inclined. If the change value is smaller than 20% of the average, the actuator 1 will be determined to be not inclined. This method is free from the influence of a change in the reproduction signal amplitude of the sector address depending upon the position of disk, for example, between at the inner periphery and at the outer periphery, thus enabling the detection of the inclination of actuator 1 more accurately.

Next explained is a method for detecting the inclination of actuator 1, based on an address error rate of sector address. Since the reproduction signal amplitude of the sector address decreases depending upon the inclination of actuator 1, as described previously, the error rate of address data decoded from the reproduction signal also increases. This detection method detects the inclination of actuator 1 utilizing this principle. The RF signal reproduction processing circuit 55 calculates the error rate of address data from the error correcting signal added to the address information as described previously, and transfers it together with the address information 58 to the microcomputer 49. This is carried out for each sector, and the error rate of sector address data is transferred for every sector. The microcomputer 49 compares the error rate included in the address information with a predetermined value. If the error rate is greater than the predetermined value, the microcomputer will determine that the inclination of actuator 1 is large; if the error rate is smaller than the predetermined value, the microcomputer will determine that the inclination of actuator 1 is small.

This inclination detection method, when compared with the foregoing detection methods by the amplitude value of address signal, does not necessitate the amplitude detecting circuit 54 of sector address signal and the A/D converter 57, so that the structure can be simplified by that extent and the cost can be decreased. There is another method in which error rates of address data for plural sectors, for example, for two sectors, are stored in a memory and it is determined that the inclination of actuator 1 is small if the error rates of the two sectors both are smaller than a predetermined value or that the inclination of actuator 1 is large if either one of the error rates of the two sectors is greater than the predetermined value. When the actuator 1 is vibratingly inclined, there is such a chance that the inclination is small at the first sector but becomes large at the next sector. In such cases, the inclination of actuator 1 can thus be detected certainly by judging the inclination of actuator 1 with reference to the error rates of plural sectors.

Next explained is a method for detecting the inclination of actuator 1 using the tracking error signal. First explained is a process to produce the tracking error signal. The light beam from the semiconductor laser in the fixed optical system is reflected upward by the flap mirror 1B in the actuator 1, as shown in FIG. 5, and is condensed into a fine light spot by the objective lens 1A to be projected to the disk. Part of the projected light is reflected by the disk surface and the reflected light travels again via the objective lens 1A and flap mirror 1B to be detected by the bisected tracking sensor 41 in the fixed optical system. The tracking sensor 41 is positioned so as to be equivalent to the arrangement as shown in FIG. 5, and the tracking error signal is produced by differentially detecting signals from the two sensor elements in the tracking sensor 41 by the differential amplifier 42.

In this arrangement, when the actuator 1 is inclined in the inclination direction shown by the arrow in FIG. 5 (or when the actuator 1 pitches relative to the seek direction), the flap mirror 1B also rotates to move the reflected light from the disk vertically on the tracking sensor 41. Therefore, the tracking error signal obtained from the signals from the tracking sensor 41 includes a component of inclination of actuator 1. Thus, the inclination of actuator 1 can be detected utilizing it. When this detection method is used, the microcomputer 49 checks the amplitude of the tracking error signal prior to recording or reproduction of data. The tracking error signal is taken through the A/D converter 47 into the microcomputer 49. The microcomputer 49 will determine that the inclination of actuator 1 is large if the amplitude is out of a predetermined range; it will determine that the inclination of actuator 1 is small if the amplitude is within the predetermined range. This detection method can detect the inclination of actuator 1 even with a disk without a sector address or with a disk of a format with low frequency of occurrence of a sector address.

The actuator 1 has a natural frequency of torsional vibration, and the frequency of torsional vibration in pitching directions with respect to the seek direction is also specific to the actuator 1. Thus, the inclination of actuator 1 can be detected utilizing this torsional vibration frequency. Specifically, a digital filter is provided in the microcomputer 49 so as to emphasize the frequency of pitching of the actuator 1. For example, if the frequency of pitching mode of the actuator 1 is 40 Hz, a digital band-pass filter of around 40 Hz is constructed. Then the tracking error signal taken in through the A/D converter 47 is allowed to pass the filter. If the output from the filter is out of a predetermined range, the inclination of actuator 1 is determined to be large; if it is within the predetermined range, the inclination of actuator 1 is determined to be small. The inclination detection with higher accuracy can be achieved by detecting the inclination of actuator 1 from the tracking error signal utilizing the pitching frequency of actuator 1 as discussed above.

Figure 7:
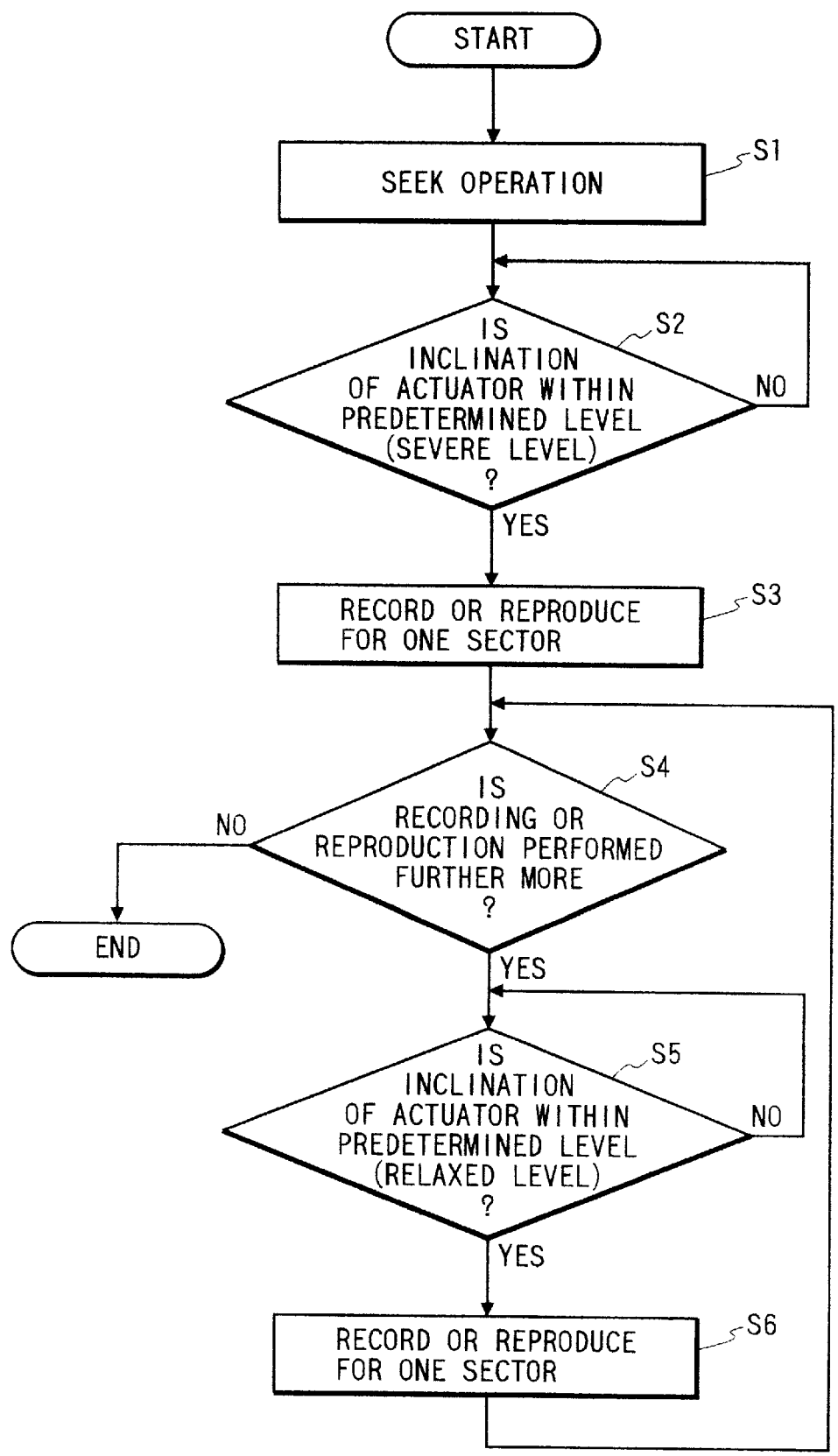
FIG. 7 is a flowchart for explaining the operation of the second embodiment of the present invention.

Next explained is the second embodiment of the present invention. This embodiment is an example in which a criterion for judging the inclination of actuator 1 upon recording or reproduction immediately after the seek operation is different from that upon recording or reproduction thereafter. FIG. 7 is a flowchart to show the operation of the present embodiment. In FIG. 7, the light spot is normally in a state of tracking a certain track; that is, the switch 45 is connected to the side of the phase compensator 44 while the light spot is in a state of tracking either one track. When in this state an upper host computer (not shown) issues a recording or reproducing command, the microcomputer 49 reproduces a current sector address of the light spot and calculates the difference between the current address and an address of the designated sector so as to obtain the number of tracks to seek. For example, supposing the current sector address is 30000 and the command is to record data for ten sectors from the sector address 10000 of disk, the difference between the sector addresses is 20000. For example, supposing the number of sectors in a track is 20, the number of tracks to seek is thus 1000.

After obtaining the number of tracks to seek, the microcomputer 49 changes over the switch 45 to the side of the D/A converter 48, thereby switching the control from the tracking control to the seek control. Then the microcomputer 49 supplies a control signal through the D/A converter 48 to the driver 45 to drive the tracking coil 13, thereby seeking the actuator 1 toward an objective track or sector (S1). When the actuator 1 reaches the objective track, the switch 45 is turned to the side of the phase compensator 44 so as to perform the tracking control. After the seek operation is completed in this manner so as to bring the light spot to the sector address 10000, the microcomputer 49 checks the inclination of actuator 1 in the same manner as in the previous embodiment (S2). The inclination of actuator 1 may be detected by the inclination sensor 51 or may be detected using either one of the detection methods explained previously. The present embodiment is arranged so that when the inclination of actuator 1 is checked immediately after the seek operation, the reference value for judging if the actuator 1 is inclined is set at a severer value than the ordinary reference value.

The microcomputer 49 determines whether the actuator 1 is inclined or not by comparing the detection value of the inclination sensor 51 with this severe reference value. If the actuator 1 is determined to be inclined, the microcomputer continues checking the inclination of actuator 1 and inhibits the recording operation. On the other hand, if the actuator 1 is determined to be not inclined with the severe reference value, data is recorded in the sector of the first sector address 10000 (S3). After completion of recording in one sector, it is determined whether further recording or reproduction is to be performed (S4). When recording or reproduction is not necessitated, the processing is terminated at that point. Recording is expected to continue for ten sectors herein. Thus, the determination is to perform further recording, and the inclination of actuator 1 is again checked at S5.

In this case of checking of inclination, the reference value for judging if the actuator 1 is inclined is set at a relaxed value as compared with the foregoing reference value employed immediately after the seek operation. The microcomputer compares the detection value of the inclination sensor 51 with this relaxed reference value to determine whether the actuator 1 is inclined. This relaxed reference value will be used to determine if the actuator 1 is inclined, at any other time than immediately after the seek operation. When the result of judgment with this relaxed reference value confirms that the actuator 1 is inclined, the microcomputer 49 continues checking the inclination. Once the actuator 1 is determined to be not inclined, data is recorded in the next sector (S6). Then the processes of steps S4 to S6 are repeated to record data sector-by-sector in order to determine whether the actuator 1 is inclined with the relaxed reference value for each sector.

Since in the present embodiment whether the actuator 1 is inclined is determined with the severe reference value only immediately after the seek operation, the inclination of the actuator, which can easily to occur immediately after the seek operation, can be detected surely and data can be recorded or reproduced stably and with high reliability. Since whether the actuator 1 is inclined is determined with the relatively relaxed reference value at any time other than immediately after the seek operation, the probability is low of erroneous determination of determining that the actuator 1 is inclined though not inclined in actual, and it can prevent a decrease in throughput of the apparatus caused by stopping recording or reproduction of data because of the erroneous determination. Some actuators will have no inclination at any time other than immediately after the seek operation because of the characteristics thereof. In such cases, the apparatus may be arranged not to check the inclination of the actuator except for immediately after the seek operation. For detecting the inclination of the actuator, the apparatus can use either one of the various detection methods as discussed previously. In either case, the microcomputer 49 is assumed to have a severe reference value and a rather relaxed reference value as reference values for judging the inclination of actuator 1 and to determine whether the actuator 1 is inclined or not, as changing the reference values one from another depending upon the time of determination, either immediately after the seek operation or at any other time.

Figure 8:
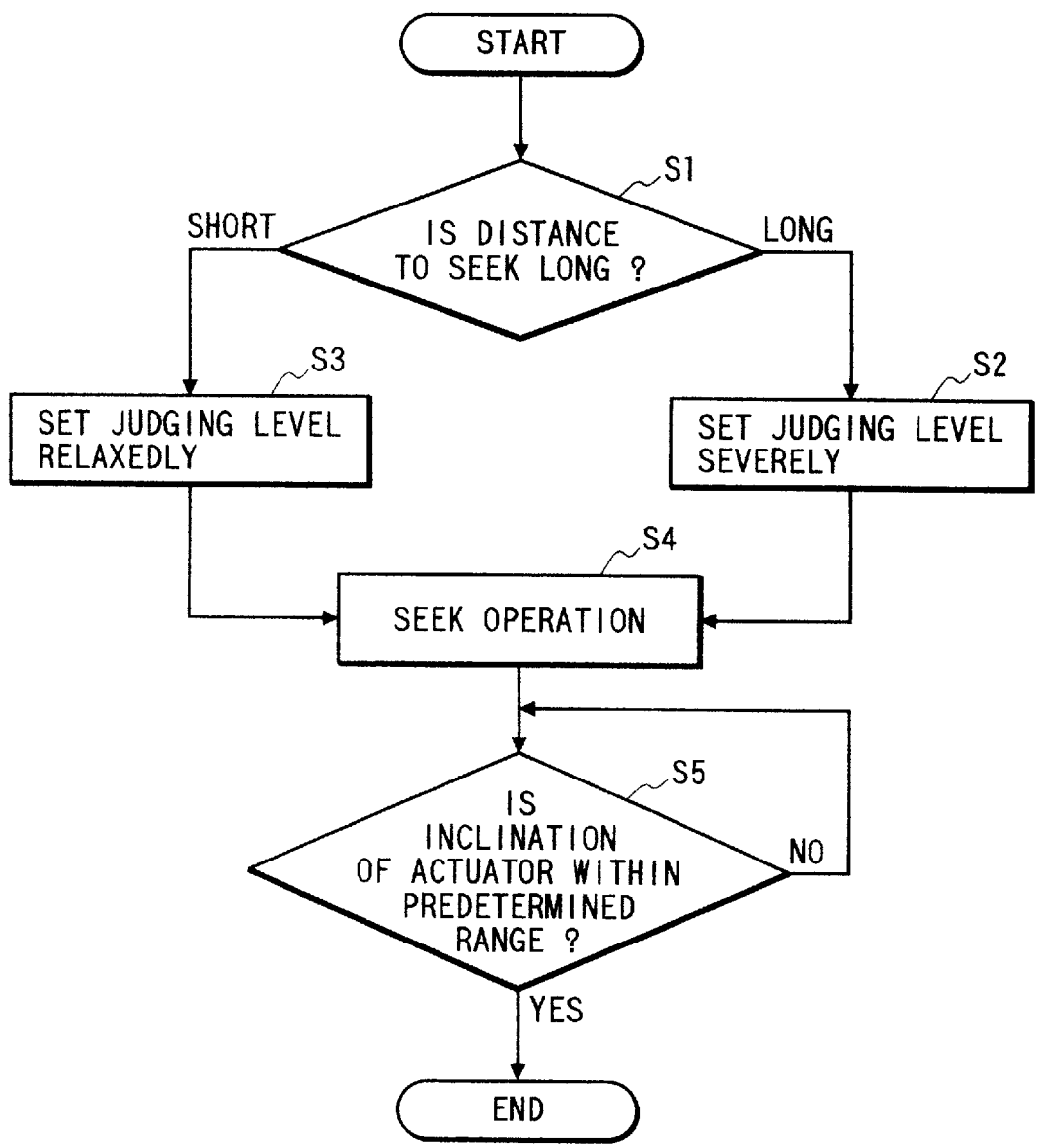
FIG. 8 is a flowchart for explaining the operation of the third embodiment of the present invention.

Next explained, referring to FIG. 8, is the third embodiment of the present invention. This embodiment is an example in which the reference values for determining whether the actuator 1 is inclined or not are changed one from another depending upon the distance over which seeking occurs. In FIG. 8, when the host computer issues a recording or reproducing command, the microcomputer 49 calculates the number of tracks to seek from the current position to the objective position in the same manner as in the previous embodiment. Next, the microcomputer 49 determines whether the seek distance is smaller or larger than a predetermined value (S1), and sets a reference value for determining the actuator 1 is inclined or not, depending upon the result of determination. In the present embodiment, for example, if the number of tracks to seek is greater than 100, the judgment criterion is set to a severe value at S2; if the number of tracks to seek is smaller than 100, the judgment criterion is set at S3 to a relaxed value rather than the foregoing severe value.

After that, the microcomputer 49 controls the actuator 1 to perform the seek operation (S4), and the microcomputer checks the inclination of actuator 1 when the light spot reaches the objective sector (S5). Namely, the microcomputer detects the inclination of actuator 1 and compares it with the reference value set above to determine whether the actuator 1 is inclined. Here, if the actuator 1 is determined to be inclined, the microcomputer will continue checking the inclination of actuator 1. If the microcomputer determines that the actuator 1 is not inclined, it will carry out recording or reproduction of data in the objective sector (S5). When recording or reproduction of data is continuously carried out in the next sector, the microcomputer again returns to S1 to carry out the same processing. In this case, since the seek distance is 0, the judgment criterion for judging whether the actuator 1 is inclined is set to the relaxed value.

Since the present embodiment is arranged so that either of the reference values for judging the inclination of actuator is set depending upon the seek distance and whether the actuator 1 is inclined is determined with the severe reference value immediately after the seek operation of a relatively long distance, the inclination of actuator 1, which easily occurs immediately after the relatively long seek operation, can be detected surely and data can be recorded or reproduced stably and with high reliability. Since whether the actuator 1 is inclined is determined with the relaxed reference value rather than the foregoing severe reference value, immediately after the seek operation of a relatively short distance, the probability can be low of erroneous judgment that the actuator 1 is inclined though not inclined in actuality, and the apparatus can prevent a decrease in the throughput of the apparatus caused by stopping recording or reproduction of data because of the erroneous judgment. Some actuators will have no inclination immediately after a relatively short seek operation because of the characteristics thereof. In such cases, the apparatus may be arranged not to check the inclination of the actuator.

Although the above embodiment was described to control recording or reproduction of data as judging the inclination of actuator upon recording or reproduction of data, the apparatus may be arranged to perform control depending upon the inclination of actuator only upon recording. Namely, an erroneous operation upon recording of data could destroy the data having already been recorded, but destruction of data will never occur upon reproduction of data. It is, of course, necessary to prevent various negative effects that could appear because of the inclination of actuator, and because the damage is great especially upon recording, the apparatus may be arranged to carry out the judgment of whether the actuator 1 is inclined only before recording and to control the recording operation depending upon the result of determination. This is applicable to the all embodiments. This arrangement will degrade the quality of reproduction signal because of the inclination of the actuator upon reproduction of data, but it will not destroy the data having already been recorded and there is a possibility that data can be reproduced fortunately, thus improving the throughput of data reproduction. Accordingly, by judging the inclination of the actuator only upon recording and controlling the recording operation according to the result of judgment, recording of data with high reliability can be carried out while surely preventing destruction of data and the throughput of data reproduction can be raised as high as possible upon reproduction.

The present invention as explained above has the following advantages.

(1) The inclination of the objective lens is detected and recording or reproduction is inhibited if the inclination of the objective lens is greater than the predetermined reference value, whereby recording or reproduction is not carried out when the quality of the light spot is degraded on the medium surface, which can secure the quality of the data recorded in the medium or the quality of the reproduction signal reproduced from the medium, thereby performing recording or reproduction with high reliability.

(2) By the arrangement wherein immediately after the seek operation, whether the objective lens is inclined is judged with the severer reference value than that upon normal recording or reproduction thereafter, the inclination of the objective lens, which occurs easily immediately after the seek operation, can be detected surely and the reliability of recording or reproduction of data can be secured also immediately after the seek operation likely to cause the inclination.

(3) By the arrangement wherein whether the objective lens is inclined is judged with the severer reference value for a longer seek distance, the inclination of the objective lens, which occurs especially easily occur immediately after the seek operation of a long distance, can be detected surely and the reliability of recording or reproduction of data can be secured regardless of the seek distance.

What is claimed is:

1. An optical information recording and/or reproducing apparatus for carrying out at least one of recording and reproduction of information by projecting a light beam condensed by an objective lens onto an information track of a recording medium, comprising:

detecting means for detecting an inclination of an optical axis of said objective lens with respect to a direction perpendicular to a surface of said recording medium; and control means for inhibiting said recording or reproduction of information, when it is determined that said objective lens is inclined on the basis of a detection result of said detecting means, wherein said control means determines whether said objective lens is inclined or not, with a severer reference value immediately after a seek operation of said light beam than upon a normal recording or reproducing operation.

2. The optical information recording and/or reproducing apparatus according to claim 1, wherein said control means compares a detection value of said detecting means with a predetermined reference value and if the detection value is greater than said reference value, said control means determines that said objective lens is inclined and inhibits said recording or reproduction of information.

3. The optical information recording and/or reproducing apparatus according to claim 1, wherein said control means determine whether said objective lens is inclined or not, with a severer reference value for a longer seek distance in said seek operation than a shorter seek distance.

4. The optical information recording and/or reproducing apparatus according to claim 1, wherein said detecting means comprises a light emitting element for projecting light to said recording medium and a light receiving element for receiving reflected light from said recording medium and wherein said detecting means detects an inclination of said objective lens, based on a quantity of light received by said light receiving element.

5. The optical information recording and/or reproducing apparatus according to claim 4, wherein said detecting means is provided in a holder for holding said objective lens.

6. The optical information recording and/or reproducing apparatus according to claim 1, wherein said detecting means detects an inclination of said objective lens, based on an amplitude value of a reproduction signal of address information reproduced from said recording medium.

7. The optical information recording and/or reproducing apparatus according to claim 1, wherein said detecting means detects an inclination of said objective lens, based on an error rate of address information reproduced from said recording medium.

8. The optical information recording and/or reproducing apparatus according to claim 1, wherein said detecting means detects an inclination of said objective lens, based on an amplitude value of a tracking error signal.

9. The optical information recording and/or reproducing apparatus according to claim 1, said apparatus further comprising a holder for holding said objective lens, moving means for moving said holder in a direction to cross information tracks on said recording medium, and a filter for extracting components of frequencies near a pitching frequency of said moving means from a tracking error signal, wherein said detecting means detects an inclination of said objective lens, based on an amplitude value of the tracking error signal having passed through said filter.

10. An optical information recording and/or reproducing method for carrying out at least one of recording and reproduction of information by projecting a light beam condensed by an objective lens to an information track of a recording medium, comprising:

a step of detecting an inclination of an optical axis of said objective lens with respect to a direction perpendicular to a surface of said recording medium; and a step of inhibiting said recording or reproduction of information, when it is determined that the objective lens is inclined on the basis of a detection result of said detecting step, wherein it is determined in said inhibiting step whether the objective lens is inclined or not, with a severer reference value immediately after a seek operation of said light beam than upon a normal recording or reproducing operation.

* * * * *

UNITED STATES PATENT AND TRADEMARK OFFICE
CERTIFICATE OF CORRECTION

PATENT NO. : 5,808,984

DATED : September 15, 1998

INVENTOR(S) : HISATOSHI BABA

It is certified that error appears in the above-identified patent and that said Letters Patent is hereby corrected as shown below:

Column 2
  Line 60, "of," should read --of the--.

Column 10
  Line 36, "to" should be deleted.
  Line 37, "detected surely" should read --surely detected--.

Column 11
  Line 35, "detected surely" should read --surely detected--.

Column 12
  Line 31, "occur" should be deleted.
  Line 63, "determine" should read --determines--.

Signed and Sealed this

Seventh Day of September, 1999

Attest:

Q. TODD DICKINSON

*Attesting Officer*     *Acting Commissioner of Patents and Trademarks*